United States Patent [19]

Tamagno et al.

[11] Patent Number: 5,015,060
[45] Date of Patent: May 14, 1991

[54] CONNECTOR FOR OPTICAL FIBRE CABLES

[75] Inventors: Didier Y. F. Tamagno, Rocbaron; Georges L. J. M. Mas, Saint-Tropez; Alain F. E. A. Navelier, La Garde, all of France

[73] Assignee: Societe ECA, Assnieres, France

[21] Appl. No.: 461,388

[22] Filed: Jan. 5, 1990

[30] Foreign Application Priority Data

Jan. 10, 1989 [FR] France .................. 89 00207

[51] Int. Cl.⁵ .............................................. G02B 6/36
[52] U.S. Cl. ............................... 350/96.20; 350/96.21
[58] Field of Search ............... 350/96.20, 96.21, 96.22, 350/96.23

[56] References Cited

U.S. PATENT DOCUMENTS

| | | | |
|---|---|---|---|
| 4,146,299 | 3/1979 | Wellington et al. | 350/96.21 |
| 4,411,491 | 10/1983 | Larkin et al. | 350/96.20 X |
| 4,634,214 | 1/1987 | Cannon, Jr. et al. | 350/96.23 X |
| 4,741,590 | 5/1988 | Caron | 350/96.20 X |
| 4,832,435 | 5/1989 | Suzuki et al. | 350/96.20 |
| 4,867,523 | 9/1989 | Scott, Jr. | 350/96.20 |

Primary Examiner—John D. Lee
Assistant Examiner—Phan T. Heartney
Attorney, Agent, or Firm—Martin Smolowitz

[57] ABSTRACT

In this connector for cables having optical fibers of the type comprising a body (19) having a bore (20) in which a female element (1) and a male element (2) are interconnected, the elements (1, 2) each comprise an arrangement (10, 18) for providing a mutual angular positioning of the elements, the female element (1) being covered with a tearable protective hood (13), and a device (24) is provided in the body (19) for immobilizing the hood (13) in the body. The angular positioning arrangement comprises on the male element (2) an inclined surface (18) on a member (17) surrounding the male element, and an inclined surface (10) inclined in a corresponding manner on the cut end of the body (9) of the female element and defining a sharp edge (11) adapted to cut and tear the hood from the interior.

12 Claims, 2 Drawing Sheets

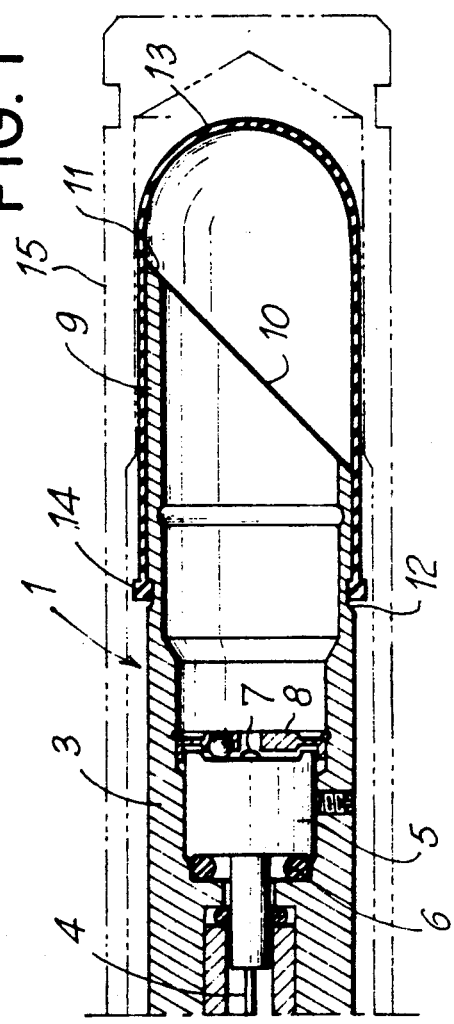
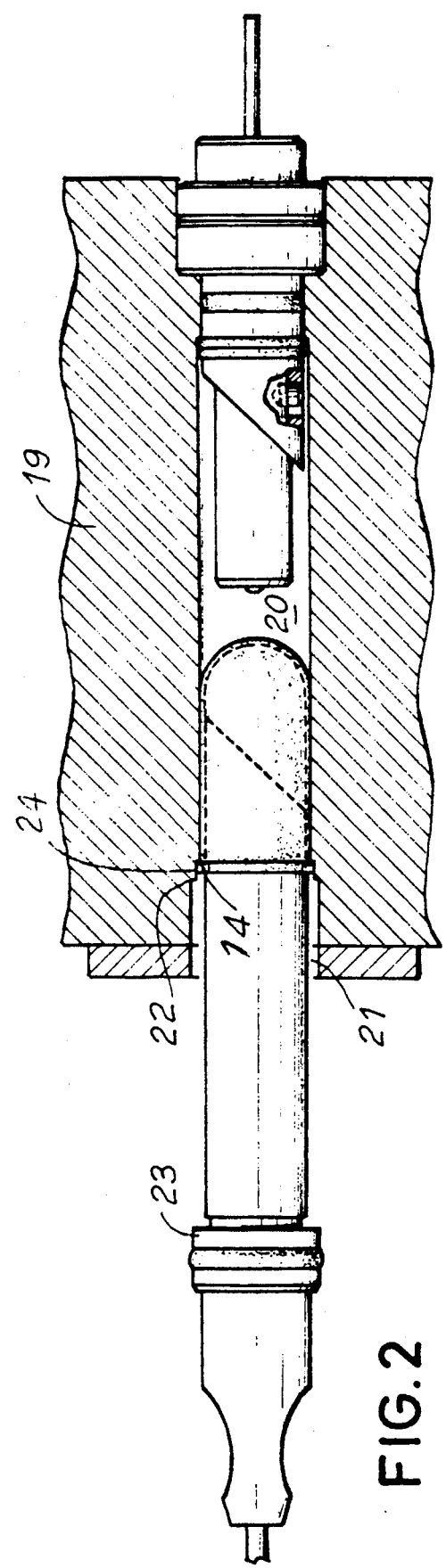

CONNECTOR FOR OPTICAL FIBRE CABLES

BACKGROUND OF THE INVENTION

The present invention relates to a connector for cables and particularly for optical fibre cables.

The development of underground networks for information transmission through optical fibre cables has resulted in the development of different types of connectors. However, optical fibre cables are at the present time also employed in applications such as the transmission of information between an underwater system and its exploitation platform.

In this case, the cable itself usually constitutes a so-called "consumable" product in that it must be replaced at each operation to ensure a reliable connection between the apparatus and its base.

The conditions of utilization of these apparatus in a water environment, in particular a seawater environment, are such that it is very important to arrange that the parts of the connectors are perfectly protected not only against moisture but also against any pollutions which might arise aboard ships, barges or the like.

Although it is relative easy to construct one of the elements of a connector in such manner that it is mounted for example in one end of a bore of a block constituting the body of the connector, this bore being closed at its opposite end by a removable obturating plug, the fact of providing a simple cap which is also removable on the second element of the connector for protecting it before it is connected to the first element inside said bore, has not been found to be sufficient in practice.

Indeed, the cap may be accidentally pulled away and, moreover, the end of the connector may be wetted with seawater between the moment the protective cap is removed and the moment the element is finally inserted in the bore, which already contains the other element of the connector.

A type of connector is known comprising a male element and a female element in which the two elements each comprise at least one beam-magnifying lens disposed on their section and adapted to bear against an intermediate centering means which is usually mounted on the female element, as disclosed for example in U.S. Pat. No. 4,723,830.

Although it is quite effective as concerns the connection, this connector is of relatively complicated construction and not very convenient for use in relatively precarious conditions such as those encountered in an aggressive environment.

An object of the invention is to overcome the drawbacks of the known connectors.

SUMMARY OF THE INVENTION

The invention therefore provides a connector particularly for optical fibre cables, the connector being of the type comprising a body having a bore and in which male and female elements are interconnected within the bore, wherein said elements each comprise means for effecting a mutual angular positioning during their connection, the female element being covered with a tearable protective hood, including means being provided on the body for immobilizing said hood in the body, and means being provided on the end of the female element for cutting and tearing said hood from inside the female element.

According to another feature of the invention, said angular positioning means are constituted by surfaces which are inclined in an identical manner and surround each of said male and female elements, and are adapted to come into contact with each other in a position of connection of said elements.

Advantageously, said inclined surface of the male element is defined by a tubular member cut on the bias and surrounding the male element, while on the female element said surface is formed by its end which is cut on the bias in a corresponding manner and defines a sharp edge adapted to cut and tear said hood.

The following description, with reference to the accompanying drawings given by way of a nonlimitative example, will explain how the invention can be carried out.

DESCRIPTION OF THE DRAWINGS

FIG. 1 is a side elevational view of the male and female elements of a connector according to the invention for optical fibre cables, the female element being shown in longitudinal section and the body of the connector being omitted.

FIG. 2 is a view of the elements of the connector according to the invention in position in the body of the connector, in a first stage of the making of the connection.

DESCRIPTION OF THE PREFERRED EMBODIMENTS

Figure 3:
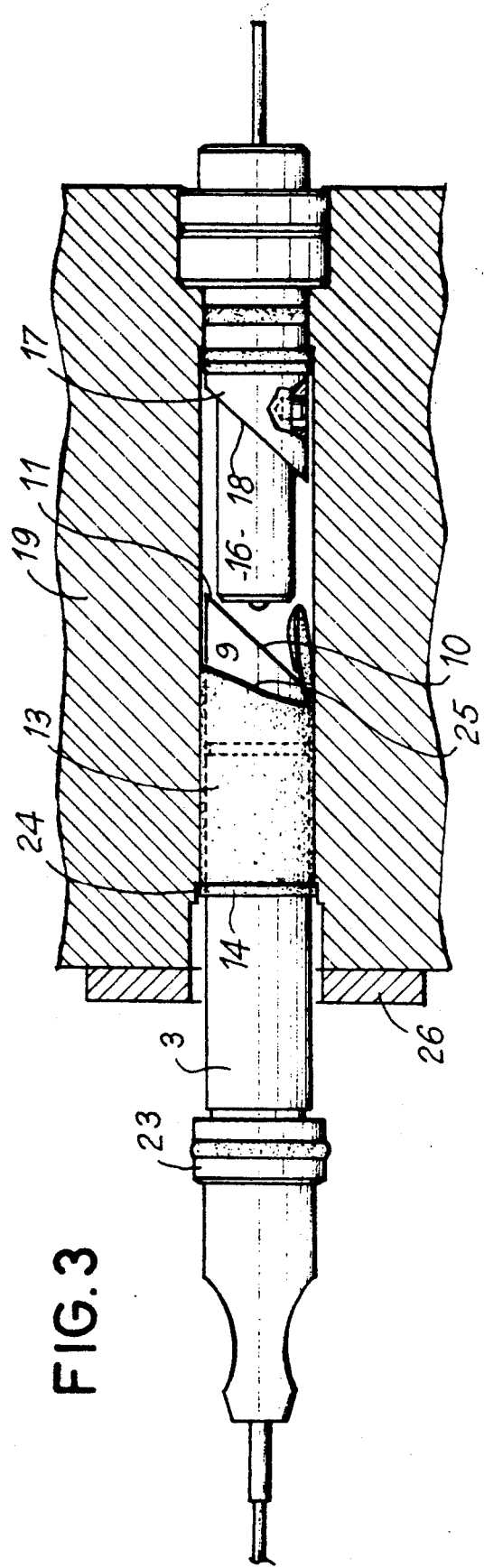
FIG. 3 is a view of the second stage of the making of the connection.

With reference to FIG. 1, there are shown the female element 1 and the male element 2 respectively of a connector for optical cables according to the invention.

The female element 1 comprises a cylindrical body 3 having an axial bore into which extends the optical cable 4 stopped by a member 5 disposed in a chamber 6 and including a lens 7. A centering device 8 including balls is disposed in confronting relation to the member 5; the arrangement of these different parts is such as that disclosed in U.S. Pat. No. 4,723,830.

According to the invention, the body 3 of the female element 1 is extended as shown at 9, being cut on the bias at roughly 45° so as to provide an inclined surface 10 having a sharp edge 11, and defines a outer shallow circular groove 12.

According to a feature of the invention, a protective hood 13 is provided which is similar to a glove finger, composed of a tearable and thin flexible material, for example rubber or a plastics material capable of being torn by the sharp edge 11 in the manner described hereinafter. The hood 13 includes around its open end a peripheral beading 14, which is disposed in the groove 12 so as to retain the hood in position.

The whole of the female element 1 may be completed with a removable cap 15 having great strength, employed for example for protecting the element from impact blows during transport and storage.

The male element 2 comprises, as disclosed in U.S. Pat. No. 4,723,830, a cylindrical part 16 having a central lens and capable of being inserted and adjusted in the female element 1, in contact with the ball centering device 8.

Figure 4:
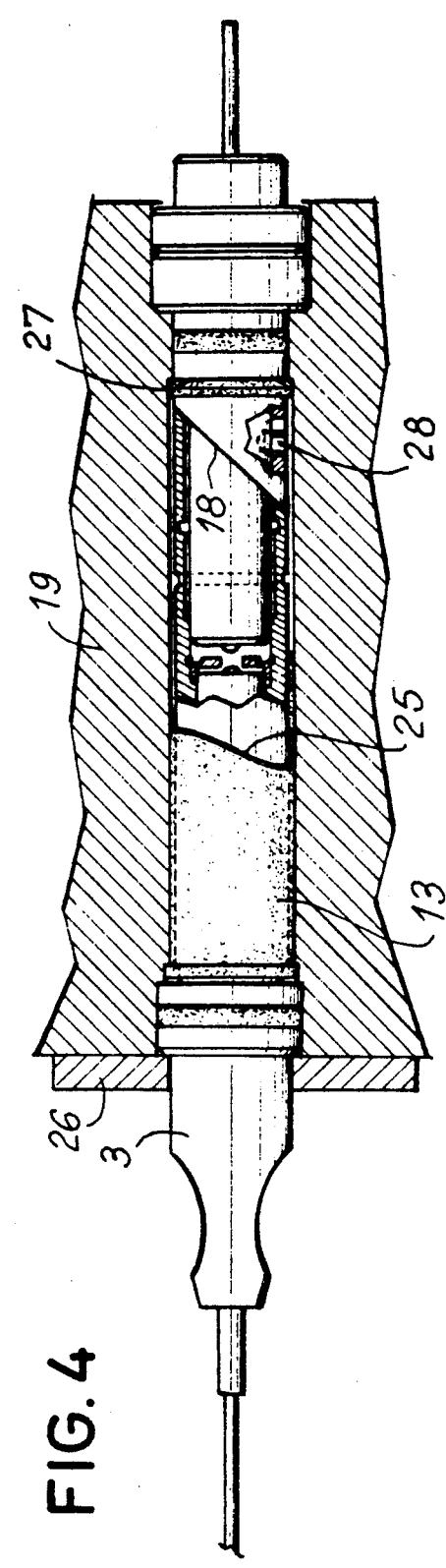
FIG. 4 is a view, with parts cut away, of the finished connection.

The cylindrical part 16 of the male element is surrounded by a cylindrical member 17 cut on the bias in a manner identical to the extended part 9 of the female element so as to provide an inclined surface 18 capable of coming into contact with the inclined surface 10 of the female element 1. The member 17 is axially slidably mounted on the male element 2, abuts a compression spring 27 and is guided by a pin 28. In this way, the member 17 may move back, once the inclined surfaces 18 and 10 have come into contact, and cause the compression of the spring 27 without losing the correct orientation owing to the effect of the pin 28 (FIG. 4).

It will of course be understood that the member 17 is located on the cylindrical part 16 at the required distance to enable the lens to come into contact with the centering device 8, at the same time as the complementary inclined surfaces 10 and 18 come into contact.

FIG. 2 partly shows the body 19 of the connector provided with a bore 20. The male element 2 is fixed in the body 19, preferably in a sealed manner, in one of the ends of the bore 20, whose diameter is roughly equal to the diameter of the extended part 9 of the female element covered with the hood 13.

Provided at the entrance of the bore 20 opposed to the end in which the male element 2 is fixed there, is a stepped counterbore 21 defining a first shoulder 22 adapted to receive a circumferential stop ring 23 of the female element 1, and a second shoulder 24 adapted to receive the circumferential beading 14 of the hood 13 when the female element 1 is engaged in the body 19, in the first stage of connection after having withdrawn the protective cap 15.

In the second stage of the connection operation shown in FIG. 3, the female element 1 is pushed so as to continue to insert it into the bore 20 of the body 19.

In this movement, the shoulder 24 retains the beading 14 of the hood 13 so that the latter slides on the part 9 of the female element 1 which continues to advance, and the sharp edge 11 then comes to cut the end of the hood and tear the latter from inside, as shown at 25 in FIG. 3.

In the final stage of the connection operation, shown in FIG. 4, the part 9 of the element 1 comes to fit around the part 16 of the male element 2 and the coming into contact of the inclined surface 10 with the surface 18 of the element 2, inclined in a corresponding way, ensures the suitable angular positioning of the two elements. Finally, stop ring 23 of the element 1 comes to fit into the counterbore 21 and bears against the shoulder 22.

Advantageously, a movable locking means 26 pivotally mounted on the end of the body 19 is brought to the locking position behind the stop ring 23.

It will be understood that the body 19 of the connector may have any outer shape providing fastening or retaining means or the like required for the envisaged application. For this reason, this outer shape of the body has not been shown.

It will also be understood that the connector according to the invention may be assembled rapidly while affording a complete protection of the female element against weather, dust, liquids and any projection of substances which may pollute the end of the cable and ensuring a faultless mutual positioning of the two connection elements.

What is claimed is:

1. A connector for cables, such as cables having optical fibres, comprising a body having a bore, a male element and a female element which are interconnected within the body, said elements each comprising means for obtaining a mutual angular positioning of said elements by an inclined surface surrounding the respective elements, a tearable protective hood covering the female element means in the body for immobilizing the hood in the body; and means provided on an end portion of the female element for cutting and tearing the hood from inside the hood during connection of said male and female elements.

2. A connector according to claim 1, further comprising a cylindrical member fixed around the female element for providing said inclined surface of the male element.

3. A connector according to claim 1, wherein the female element has an extension, said inclined surface of the female element is formed by a cutting of the extension on the bias so as to define a sharp edge constituting said means for cutting and tearing the hood.

4. A connector according to claim 1, wherein said tearable hood has a shape similar to a glove finger of thin rubber.

5. A connector according to claim 1, wherein said tearable hood has a shape similar to a glove finger of thin plastic material.

6. A connector according to claim 1, wherein said connector further including a stop member for the female element disposed in said counterbore, said counterbore defining a shoulder which constitutes said means for immobilizing the hood.

7. Connector according to claim 6, comprising locking means movably mounted on said body of the connector for retaining the female element in said bore.

8. A connector for cable, such as optical fibre cables, said connector comprising a body having a bore in one end which is adapted to receive a first connector element and the opposite end of the bore being adapted to receive a second connector element, said connector elements having means for effecting their mutual angular positioning and are adapted to co-operate with each other, each of said elements having a hollow cylindrical member which surrounds it, said means being formed, on each of the elements, by an annular surface having a flat end which is inclined by an identical angle, forming a sharp edge, and a tearable hood which covers said surface of one of the elements, means being provided in the body in order to immobilize the hood within it.

9. A connector according to claim 8, wherein said tearable hood being composed of a thin plastic material having a peripheral bead protruding around its open end, said means for immobilizing the hood in said body being formed by a shoulder form in the end of the bore of the body which is adapted to receive the second element.

10. A connector according to claim 9, wherein said shoulder being delimited by a counter-bore adapted to house a stop member of the second element.

11. A connector according to claim 8, wherein the first connector element is a male element, the second element being a female element on which said hood is arranged.

12. A connector according to claim 11, including a locking member mounted movably on the body of the connector and being adapted to co-operate with the stop member of the female element in order to immobilize the latter in the body.

* * * * *